US009990104B2

(12) United States Patent
McNamara et al.

(10) Patent No.: US 9,990,104 B2
(45) Date of Patent: Jun. 5, 2018

(54) COMPUTER-BASED APPARATUS AND METHOD FOR OPERATING ON DATA

(71) Applicant: Conduent Business Services, LLC, Dallas, TX (US)

(72) Inventors: Jeffrey Shaun McNamara, Lehi, UT (US); Michael W. Hansen, Herriman, UT (US)

(73) Assignee: Conduent Business Services, LLC, Dallas, TX (US)

( * ) Notice: Subject to any disclaimer, the term of this patent is extended or adjusted under 35 U.S.C. 154(b) by 695 days.

(21) Appl. No.: 14/528,212

(22) Filed: Oct. 30, 2014

(65) Prior Publication Data

US 2016/0124621 A1    May 5, 2016

(51) Int. Cl.
*G06F 3/048* (2013.01)
*G06F 3/0481* (2013.01)
*G06F 9/44* (2018.01)

(52) U.S. Cl.
CPC .......... *G06F 3/04817* (2013.01); *G06F 8/34* (2013.01)

(58) Field of Classification Search
CPC ... G06F 17/30398; G06F 3/04819; G06F 8/34
USPC .......... 707/769, 778, 759, 766, 204
See application file for complete search history.

(56) References Cited

U.S. PATENT DOCUMENTS 5,428,776 A * 6/1995 Rothfield .......... G06F 17/30398
5,937,415 A * 8/1999 Sheffield .......... G06F 17/30595

* cited by examiner

*Primary Examiner* — Andrey Belousov
(74) *Attorney, Agent, or Firm* — Simpson & Simpson, PLLC

(57) ABSTRACT

A computer-based apparatus, including: a memory element storing computer-readable instructions and at least one first data file; and a processor configured to execute the instructions to: display a second data file included in the at least one first data file, data fields for the second data file, and icons identifying operations applicable to first data in the second data file; accept a first input selecting a data field from the data fields for the second data file; accept a second input selecting an icon from the icons; associate the icon with the data field; generate a flowchart including the icon; display the flowchart on the GUI; generate second data by performing the operation for the icon on the first data; and replace the first data with the second data, or store the second data in a third data file included in the at least one first data file.

18 Claims, 18 Drawing Sheets

COMPUTER-BASED APPARATUS AND METHOD FOR OPERATING ON DATA

TECHNICAL FIELD

The present disclosure relates to a computer-based apparatus and method for transforming data, for example data, and applying rules and logic, for example in the form of flowcharts, to data regardless of the format or source of the data. The apparatus and method require minimal technical expertise for the user.

BACKGROUND

Know computer-based apparatus and methods for transforming and applying rules and logic to data, for example data require significant expertise of the user. For example, the apparatus and methods require a computer programmer to develop computer programming, such as XSLT or hard coded programs, to implement data transformation logic. Some known systems offer field mapping and a limited set of transformation methods.

SUMMARY

According to aspects illustrated herein, there is provided a computer-based apparatus for operating on data, including a memory element for at least one computer configured to store a plurality of computer-readable instructions and at least one first data file and a processor for the at least one computer. The processor is configured to execute the plurality of computer-readable instructions to: display, on a graphical user interface (GUI), respective representations for at least one second data file included in the at least one first data file, a plurality of data fields for the at least one second data file, and a plurality of icons, each icon in the plurality of icons identifying a respective operation applicable to first data stored in the at least one second data file; accept at least one first input selecting at least one first data field from the plurality of data fields for the at least one second data file; accept at least one second input selecting at least one first icon from the plurality of icons; associate the at least one first icon with the at least one first data field; generate a flowchart including the at least one first icon; display the flowchart on the GUI; generate second data by performing the respective operations for the at least one first icon on the first data stored in the at least one first data field; and replace the first data with the second data, or store the second data in at least one third data file included in the at least one first data file.

According to aspects illustrated herein, there is provided a computer-based apparatus for operating on data, including a memory element for at least one computer configured to store a plurality of computer-readable instructions and at least one first data file and a processor for the at least one computer. The processor is configured to execute the plurality of computer-readable instructions to: display, on a graphical user interface (GUI), respective representations for at least one second data file included in the at least one first data file, a plurality of data fields for the at least one second data file, and a plurality of icons, each icon in the plurality of icons identifying a respective operation applicable to first data stored in the at least one second data file; accept at least one first input selecting at least one first data field from the plurality of data fields for the at least one second data file; accept at least one second input selecting at least one first icon from the plurality of icons; associate the at least one first icon with the at least one first data field; generate a flowchart including the at least one first icon; display the flowchart on the GUI; generate second data by performing the respective operations for the at least one first icon on the first data stored in the at least one first data field; and replace the first data with the second data.

According to aspects illustrated herein, there is provided a computer-based apparatus for operating on data, including a memory element for at least one computer configured to store a plurality of computer-readable instructions and at least one first data file and a processor for the at least one computer. The processor is configured to execute the plurality of computer-readable instructions to: display, on a graphical user interface (GUI), respective representations for at least one second data file included in the at least one first data file, a plurality of data fields for the at least one second data file, and a plurality of icons, each icon in the plurality of icons identifying a respective operation applicable to first data stored in the at least one second data file; accept at least one first input selecting at least one first data field from the plurality of data fields for the at least one second data file; accept at least one second input selecting at least one first icon from the plurality of icons; associate the at least one first icon with the at least one first data field; generate a flowchart including the at least one first icon; display the flowchart on the GUI; generate second data by performing the respective operations for the at least one first icon on the first data stored in the at least one first data field; and store the second data in at least one third data file included in the at least one first data file.

A computer-based apparatus for operating on data, including: a memory element for at least one computer configured to store a plurality of computer-readable instructions and a plurality of data files; and a processor for the at least one computer. The processor is configured to execute the plurality of computer-readable instructions to: display, on a graphical user interface (GUI), respective representations for: first and second data files included in the plurality of data files; first and second pluralities of data fields for the first and second data files, respectively; and a plurality of icons, each icon in the plurality of icons identifying a respective operation applicable to first and second data stored in the first and second data files, respectively; accept first and second inputs selecting first and second data field from the first and second pluralities of data fields, respectively; accept third and fourth inputs selecting first and second icons, respectively, from the plurality of icons; associate the first and second icons with the first and second data fields, respectively; generate first and second flowcharts including the first and second icons, respectively; store the first and second flow charts in the memory element; display representations for the first and second flowcharts on the GUI in a first sequence; and accept a fifth input to implement the first and second flowcharts. The processor is configured to execute the plurality of computer-readable instructions to: implement the first and second flowcharts in the order to: generate third data by performing the respective operation for the first icon on the first data; replace the first data with the third data, or store the third data in a third data file included in plurality of data files; generate fourth data by performing the respective operation for the second icon on the second data; and replace the second data with the fourth data, or store the fourth data in a fourth data file included in plurality of data files.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Although any methods, devices or materials similar or equivalent to those described herein can be used in the practice or testing of these embodiments, some embodiments of methods, devices, and materials are now described.

Figure 1:
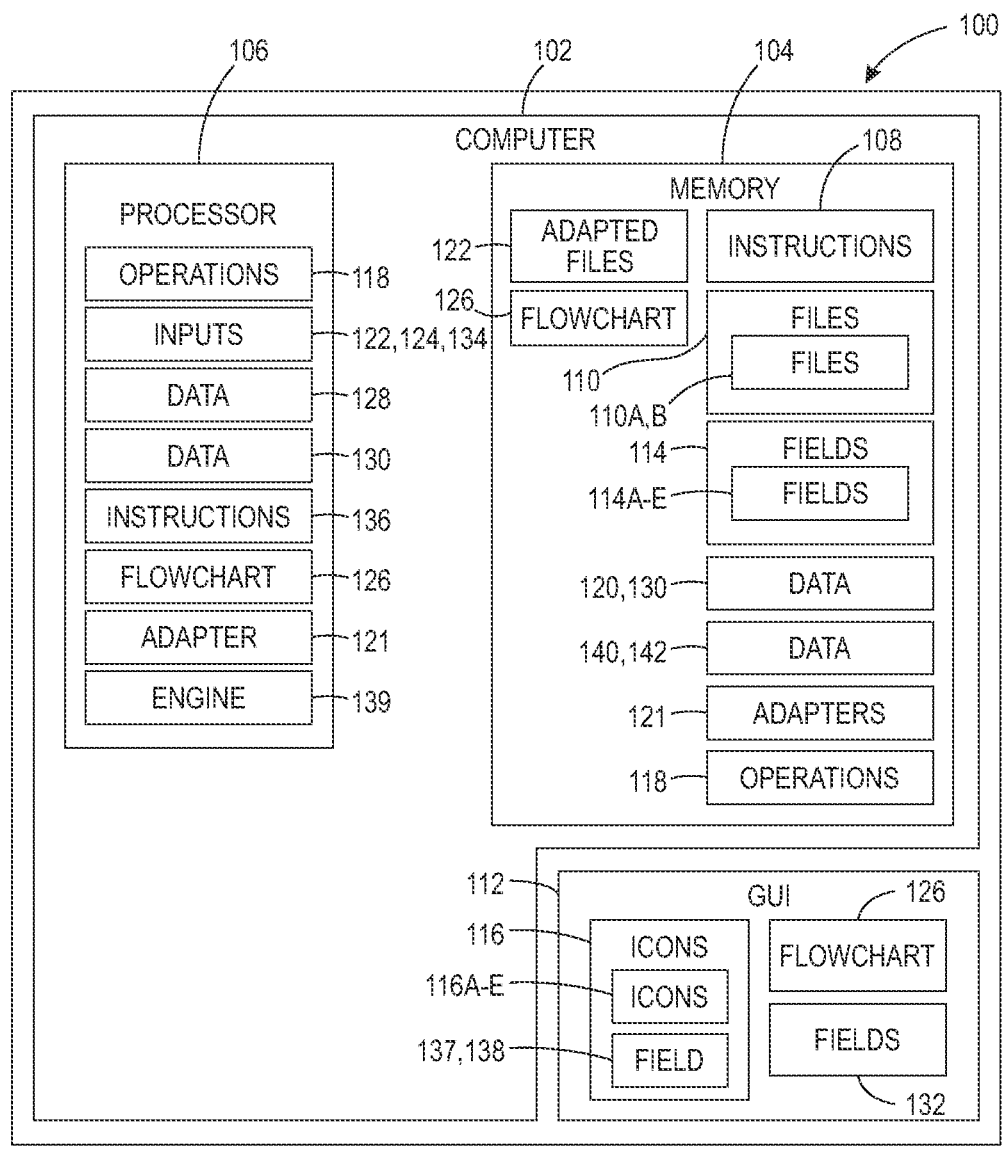
FIG. 1 is a schematic block diagram for a computer-based apparatus for operating on data.

FIG. 1 is a schematic block diagram for computer-based apparatus 100 for operating on data. Apparatus 100 includes at least one computer 102 with memory element 104 and processor 106. Element 104 is configured to store computer-readable instructions 108 and at least one data file 110 (hereinafter referred to as "files 110"). Processor 106 is configured to execute computer-readable instructions 108 to display on a graphical user interface (GUI) 112: respective representations for at least one data file 110A included in files 110; data fields 114 for some or all of the data files in file 110A; and icons 116. Each icon 116 identifies a respective operation 118 applicable to some or all of data 120 stored in files 110. Files 110 can be any type or configuration of data file known in the art. Operations 118 are stored in memory element 104.

Figure 2:
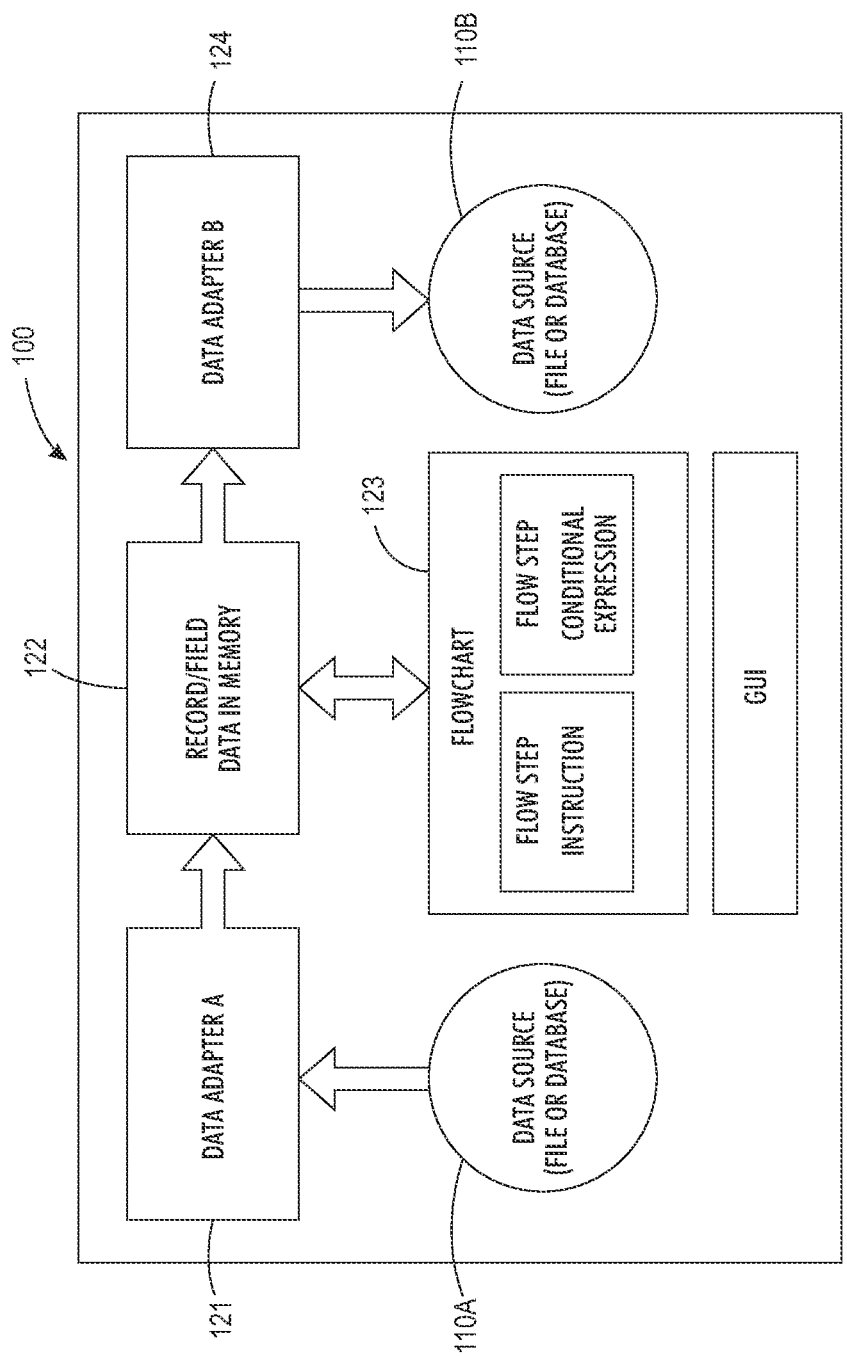
FIG. 2 is a schematic flow chart exemplifying operation of the apparatus of FIG. 1.

FIG. 2 is a schematic flow chart exemplifying operation of apparatus 100 of FIG. 1. In general, apparatus 100 operates to define rules related to processing data. In the discussion that follows, flowcharts are used as example rules; however, it should be understood that other example of rules are possible. For example, rules could be defined in computer code, in columnar format (as might be defined in an Excel spreadsheet for example) or even in paragraph format using key words/phrases defined in Word. Data adapter(s) 121 adapt data 120 from various sources including files and transactional databases into adapted files 122 with consistent structure and interface in memory 104 for use with flowchart 123. Flowchart 123 describes rules and related logic as a set of discrete processing steps, for example as implemented by icons 116 and operations 118. Each flow step, for example each icon 116, consists of specific computer instructions designed to support a discrete action, for example some or all of an operation 118, related to processing data 120. Examples of icons 116 and associated operations 118 includes 'Assign value', 'Decision', 'Set flag', and 'Match Regular Expression' as shown below.

As further described below, flow step or icon 116 also can accept and execute a user defined conditional expression in order to make a decision or assign a value. Conditional expressions are defined by the user and assigned through GUI 112. Examples of conditional expressions are greater than, less than, equal to, addition, multiplication, concatenation and so forth. As further described below, results of flowchart processing, are saved to the target data source using methods described in data adapter 121.

Processor 106 is configured to execute computer-readable instructions 108 to: accept at least one input 122 selecting at least one data field 114A (hereinafter referred to as "data fields 114A") from data fields 114; operate on data 130 in fields 114A using adapters 121; accept at least one input 124 selecting at least one icon 116A (hereinafter referred to as "icons 116A") from icons 116; associate icons 116A with data fields 114A; generate flowchart 126 including icons 116A; display flowchart 126 on GUI 112; generate data 128 by performing respective operations 118 for icons 116A on data 130 stored in data fields 114A.

Processor 106 is configured to execute the computer-readable instructions to: replace data 130 with data 128; or store data 130 in at least one data file 110B included in data files 110. In an example embodiment, once data field 114A is selected as part of flowchart 126, any icon 116 selected as part of the flowchart is automatically associated with the selected data field and the operation 118 of the selected icon 116 is executed on the selected data field when the flowchart is implemented.

In an example embodiment, processor 106 is configured to execute computer-readable instructions 108 to: for icon 116I included in icons 116A, display in flowchart 126, field 132 for receiving user instructions; accept input 134 including user instruction 136; display user instructions 136 in field 137 in icon 116B; and perform respective operations 118 for icon 116B according to user instructions 136. In an example embodiment, icon 116B includes field 138 describing respective operation 118 for icon 116B and processor 106 is configured to execute computer-readable instructions 108 to perform respective operations 118 for icon 116I according to user instructions 136 and operation 118 described in field 138.

Once flowchart 126 is defined/completed, the flowchart is saved to memory element 104. Flowchart 126 is implemented by runtime engine 139. Changes can be made to a stored flowchart using GUI 112 for redeployment to engine 139.

In an example embodiment, data fields 114A includes data fields 1149 and 114C; icons 116A includes icons 1169 and 116C; and processor 106 is configured to execute computer-readable instructions 108 to associate icons 116B and 116C with data fields 114B and 114C, respectively, and to generate data 128 by performing respective operations 118 for icons 116B and 116C on data 140 and 142 stored in data fields 114B and 114C, respectively.

In an example embodiment data fields 114A includes data fields 114B and 114C; icons 116A includes icon 116B; and processor 106 is configured to execute computer-readable instructions 108 to: associate icon 116B with both of data fields 114B and 114C; and to generate data 128 by performing respective operations 118 for icon 116B on each of data 140 and 142.

In an example embodiment, processor 106 is configured to execute computer-readable instructions 108 to: replace data 140 in data field 114B with data 128; or replace data 142 in data field 114C with data 128; or replace one or both of data 140 and 142 with at least respective portions of data 128.

In an example embodiment data file 110B includes data fields 114D and 114E and processor 106 is configured to execute computer-readable instructions 108 to: store data 128 in data field 114D; or store data 128 in data field 114E; or store at least respective portions of data 128 in data field 114D and data field 114E.

Further detail regarding apparatus 100 is provided in the pictorial representations presented and discussed below.

Figure 3:
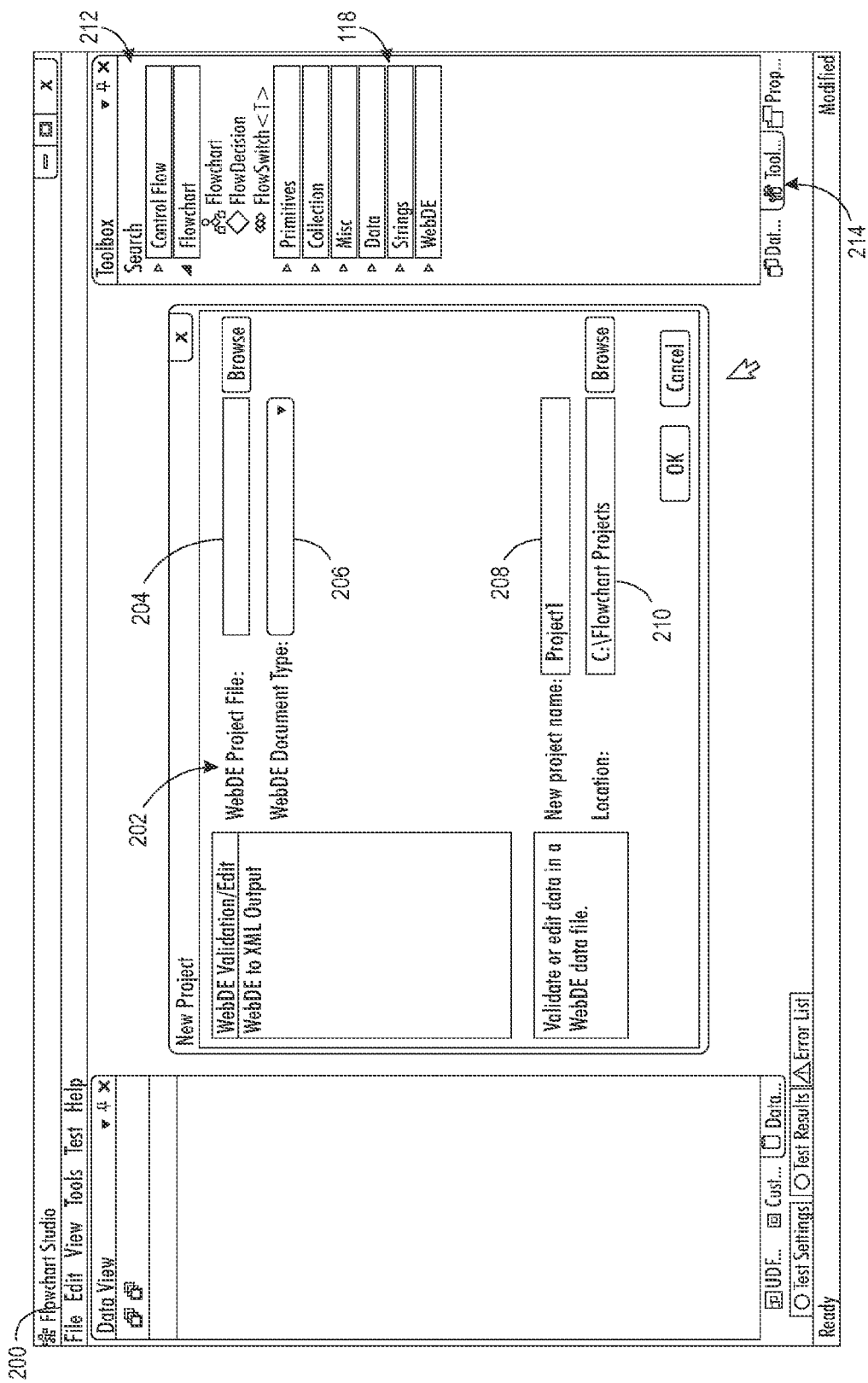
FIG. 3 is a pictorial representation of a computer screen showing initiation of a data replacement mode for a computer-based apparatus for operating on data.

FIG. 3 is a pictorial representation of a computer screen showing initiation of a data replacement mode for computer-based apparatus 100. In FIG. 3 a user has selected "New Project" from a menu pulled down from tab 200. In window 202, a data source to be operated upon (analogous to files 110) and type or configuration of the data source are inputted in fields 204 and 206, respectively. The name and the location of the rules or set of operations to be implemented, for example a flowchart analogous to flowchart 126, are inputted in field 208 and 210, respectively. Operations 118 that can be implemented by apparatus 100 are displayed in window 212 by clicking on tab 214.

Figure 4:
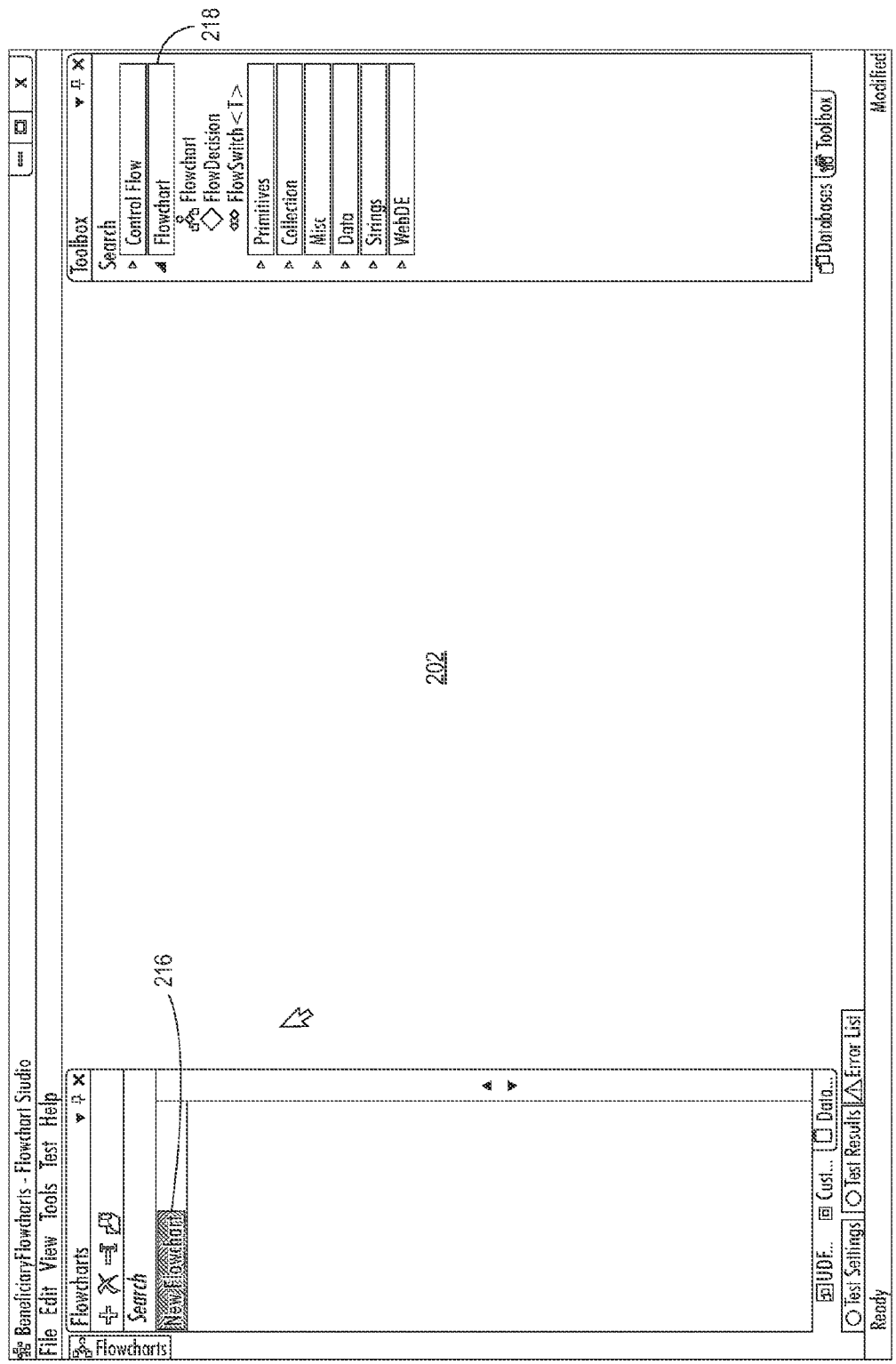
FIG. 4 is a pictorial representation of a computer screen showing a set-up display for the data replacement mode.

FIG. 4 is a pictorial representation of a computer screen showing a set-up display for the data replacement mode. In FIG. 4, window 202 has cleared and flowchart option 216, selected by clicking on field 218 in window 202, is displayed.

Figure 5:
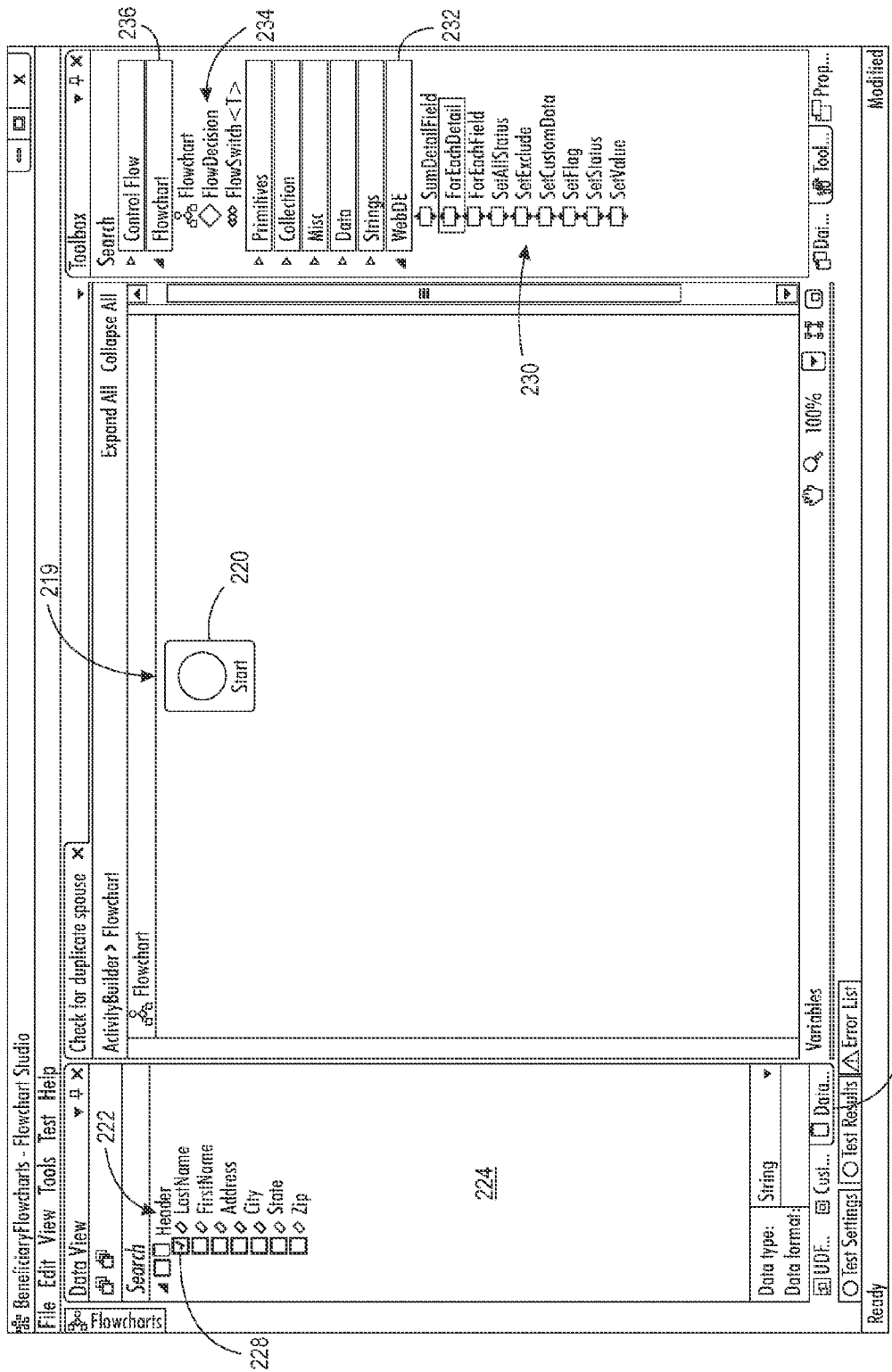
FIG. 5 is a pictorial representation of a computer screen showing start of a flowchart.

FIG. 5 is a pictorial representation of a computer screen showing start of flowchart 219. In FIG. 5, icon 220 (analogous to one of icons 116) for starting flowchart 219 (analogous to flow chart 126) is displayed in window 202. Data source 222 (analogous to data file 110A) selected in FIG. 3 is displayed in window 224 by clicking on tab 226. Data field "LastName" 228 (analogous to data field 114A) has been selected as the data field to be operated upon. Operations 230 applicable to the type or configuration of the data source are displayed by clicking on field 232. Operations 234 applicable to flowcharts are also displayed by the selection of field 236 in FIG. 3.

Figure 6:
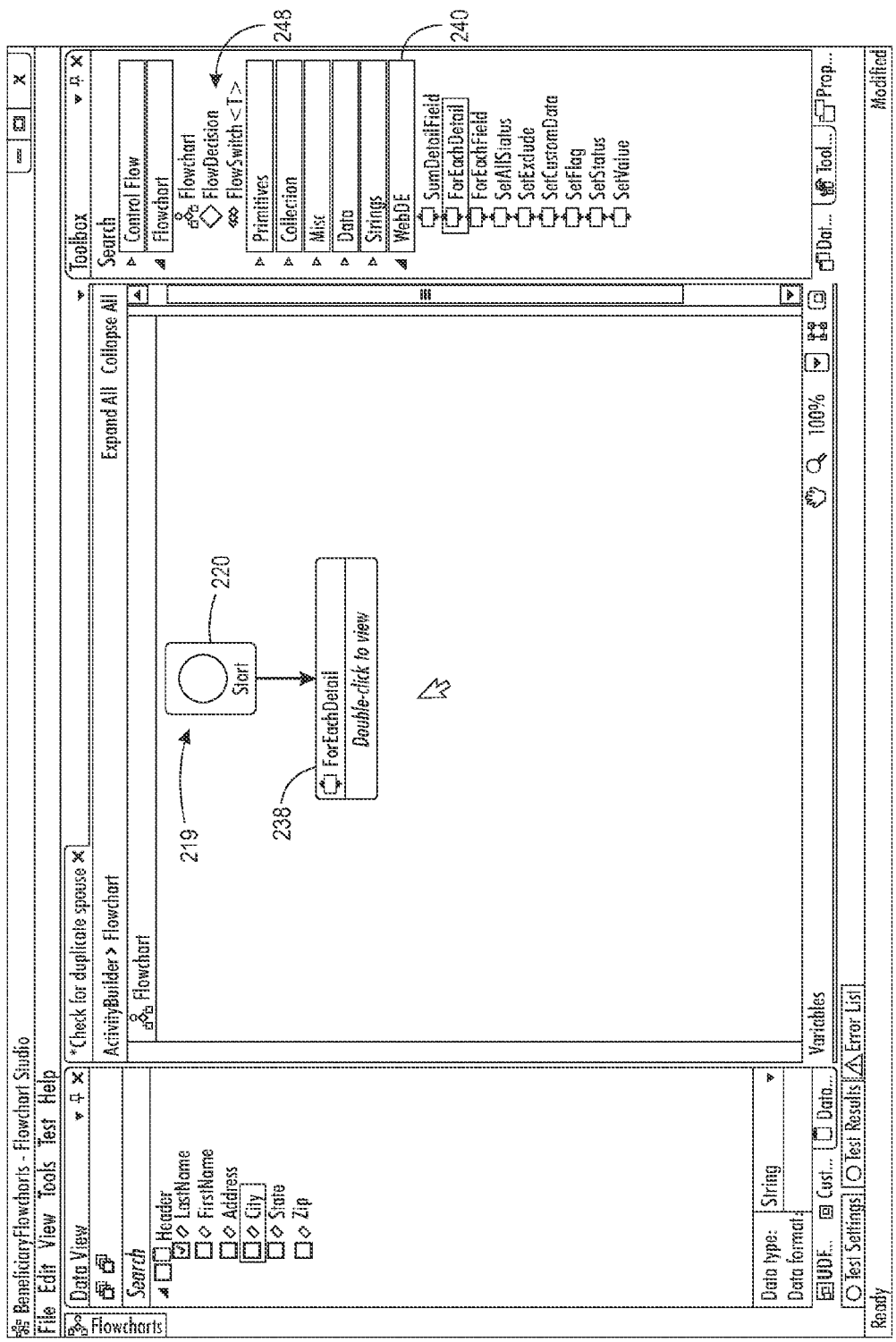
FIGS. 6 and 7 are respective pictorial representations of computer screens showing addition of flowchart elements to the flowchart of FIG. 5.
Figure 7:
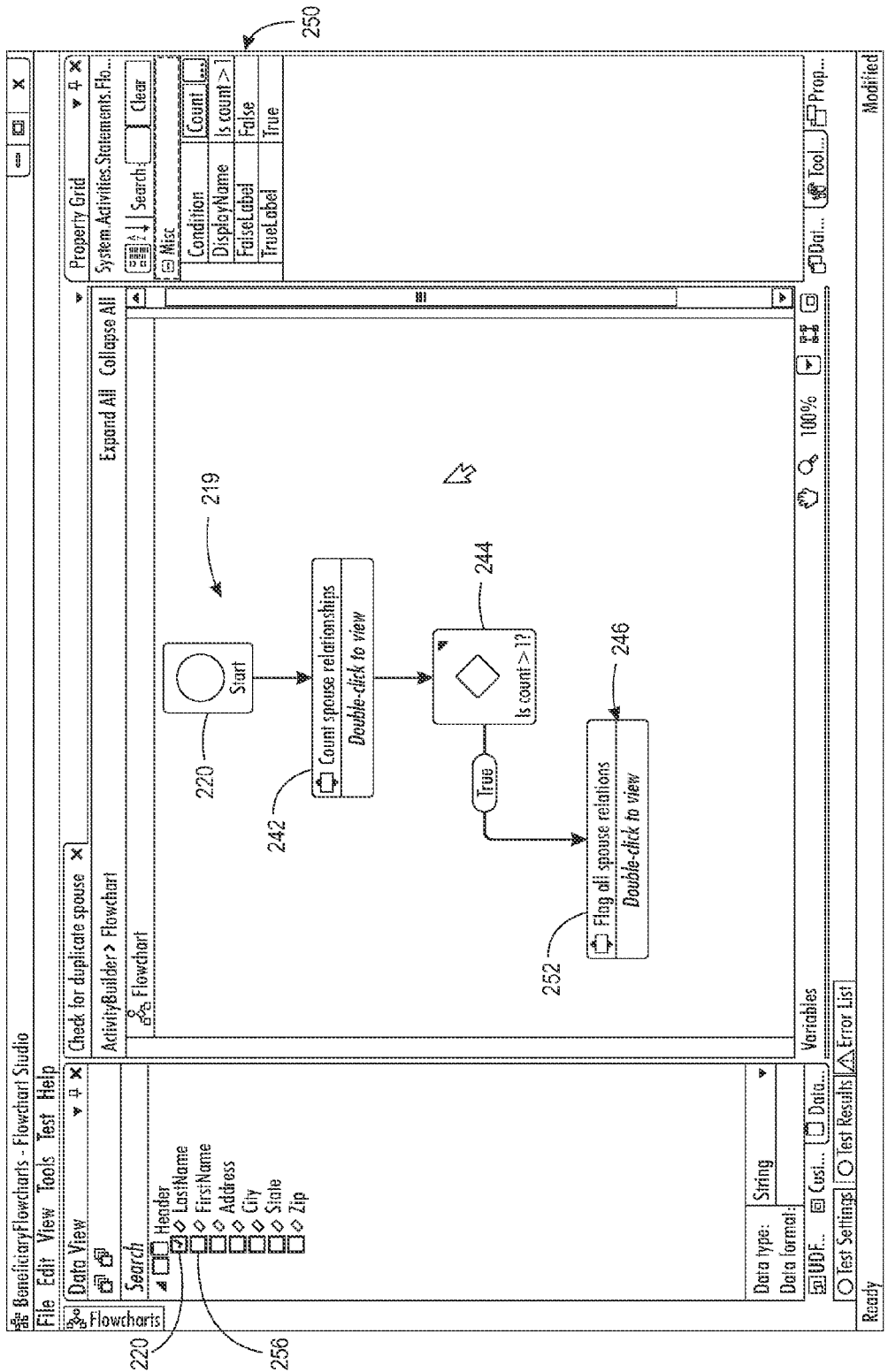

FIGS. 6 and 7 are respective pictorial representations of computer screens showing addition of flowchart elements to the flowchart of FIG. 5. Icon 238 is added to flowchart 219 by selecting field 240 in FIG. 6. In FIG. 7, the user has entered text in field 242 and icons 244 and 246 have been added to flowchart 219 by selecting fields 240 and 248 (shown in FIG. 6), respectively. Operations for icon 244 are selectable from fields 250. The user has added text to field 252 to identify the operation associated with icon 246. The operations included in flowchart 219 can be implemented to replace the data in the field "LastName." This is analogous to generating data 128 to replace data 130.

Figure 8:
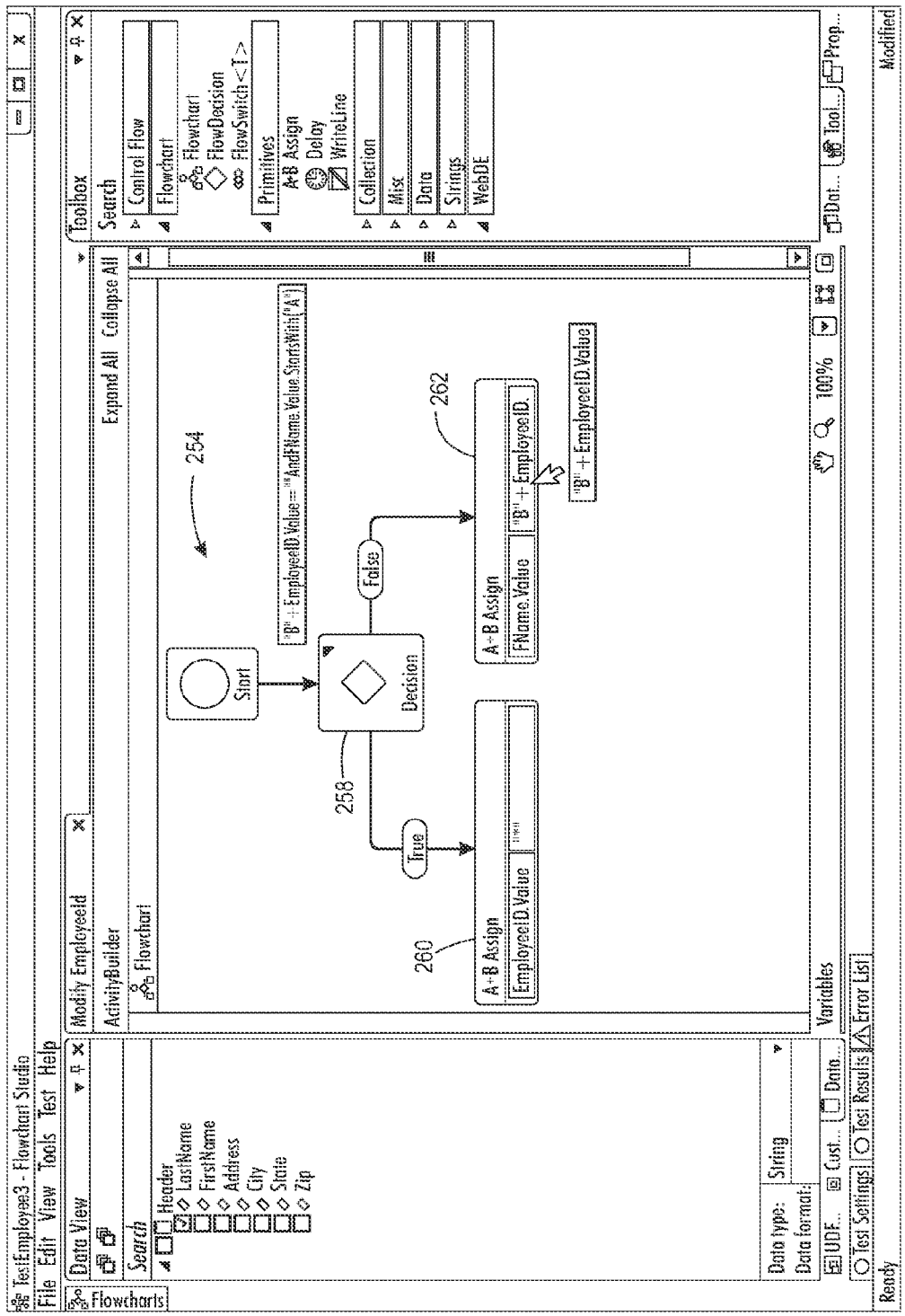
FIG. 8 is a pictorial representation of a computer screen showing a flowchart for the data replacement mode with interaction of data fields.

FIG. 8 is a pictorial representation of a computer screen showing a flowchart for the data replacement mode with interaction of data fields. For flowchart 254, data fields 228 and 256 shown in FIG. 7 have been selected. Icons 258, 260 and 262 have been added in a manner similar to that described above. In contrast to flowchart 219, flowchart 254 operates on two data field of the data source. For example, icon 258 evaluates and selects one of data fields 228 and 256. Then icon 260 and 262 operate on the selected data field accordingly.

Figure 9:
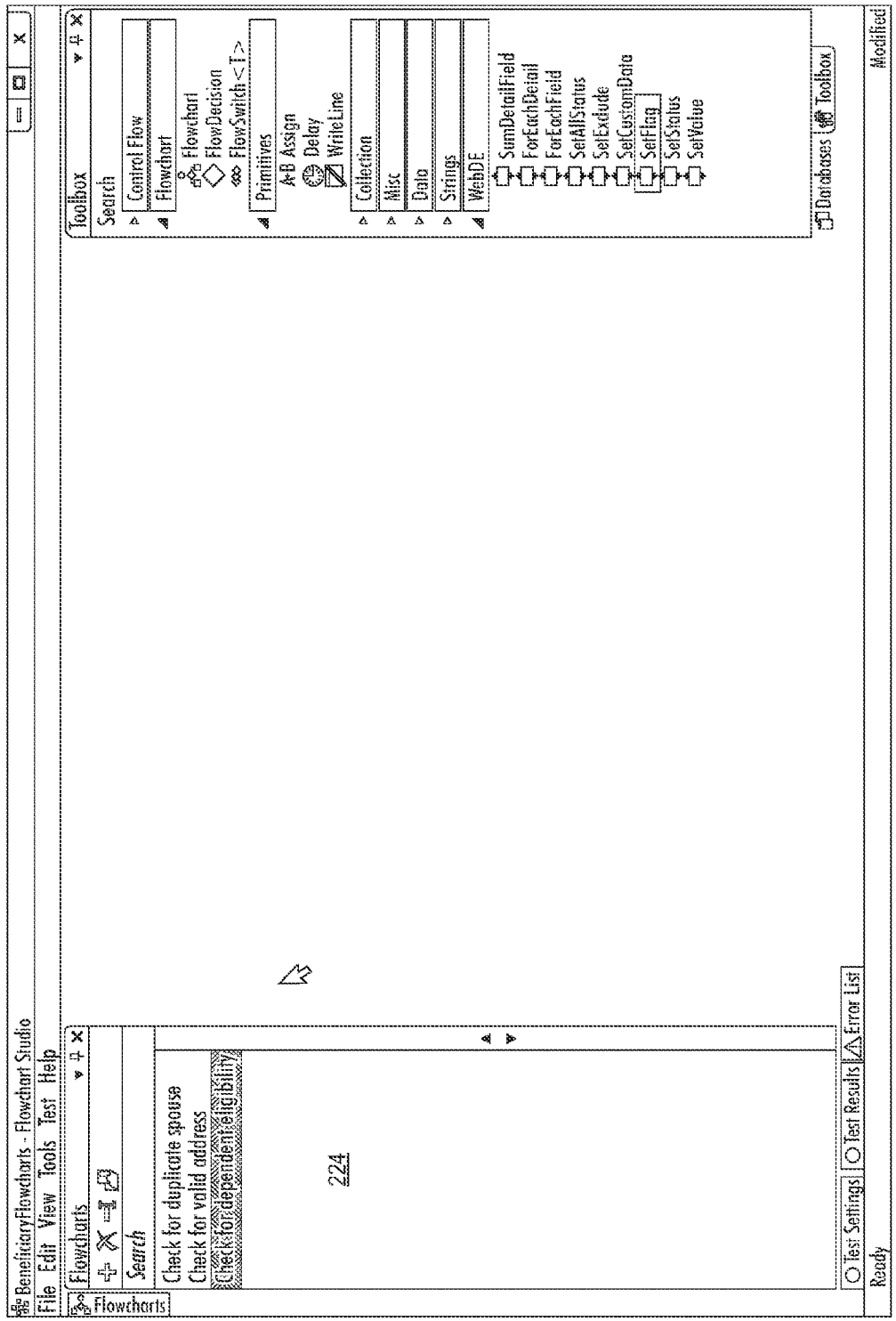
FIG. 9 is a pictorial representation of a computer screen showing a listing of flowcharts.

FIG. 9 is a pictorial representation of a computer screen showing a listing of flowcharts. FIG. 9 illustrates that multiple flowcharts can be displayed in field 224 and selected on a single screen.

Figure 10:
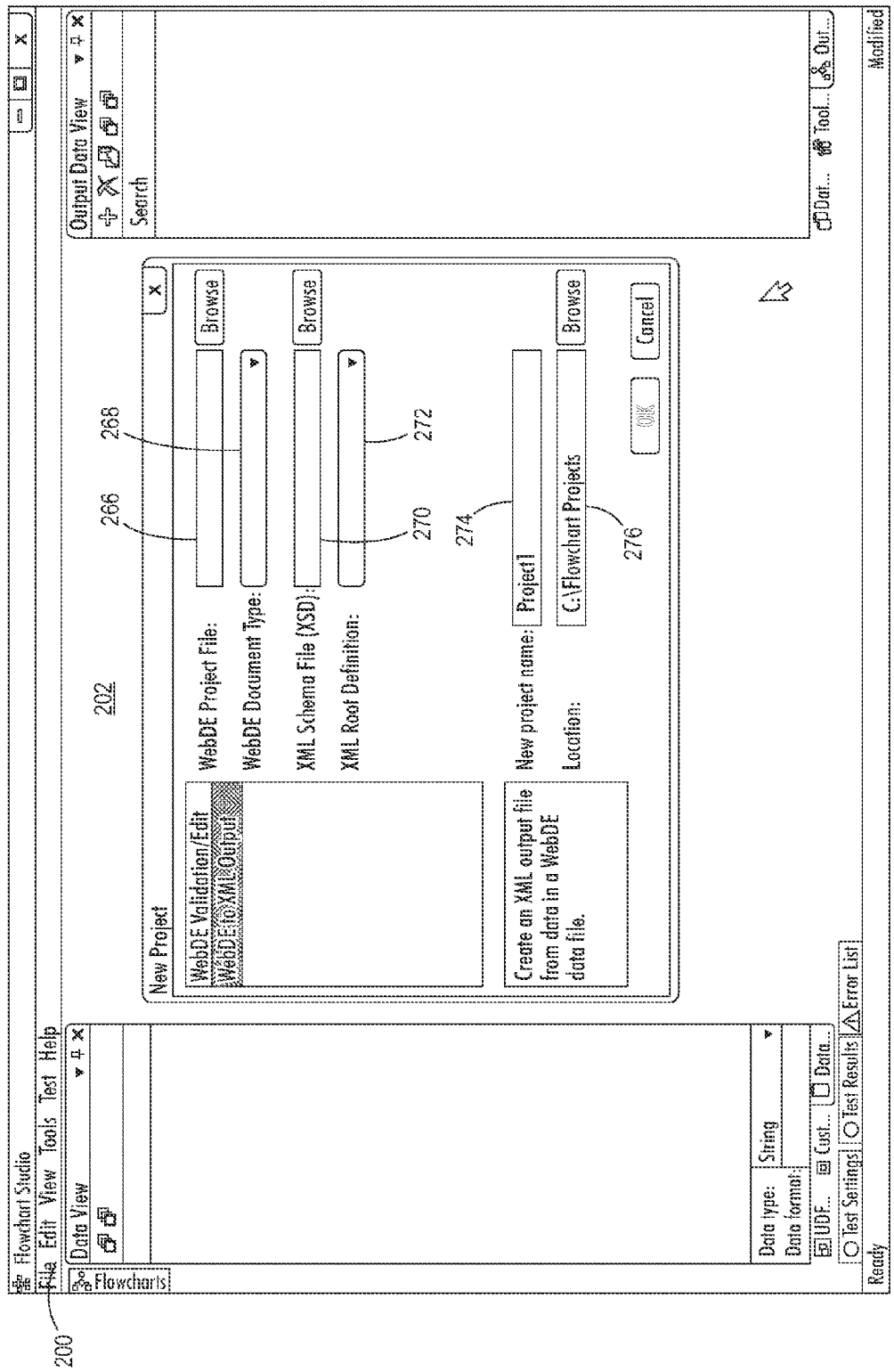
FIG. 10 is a pictorial representation of a computer screen showing initiation of a data output mode for a computer-based apparatus for operating on data.

FIG. 10 is a pictorial representation of a computer screen showing initiation of a data output mode for a computer-based apparatus for operating on data. In FIG. 10 a user has selected "New Project" from a menu pulled down from tab 200. In portion 202 of the screen, a data source to be operated upon (analogous to files 110) and type or configuration of the data source are inputted in fields 266 and 268, respectively. The destination and type or configuration of the destination are inputted in fields 270 and 272, respectively. The name and the location of the rules or set of operations to be implemented, for example a flowchart analogous to flowchart 126, are inputted in field 274 and 276, respectively.

Figure 11:
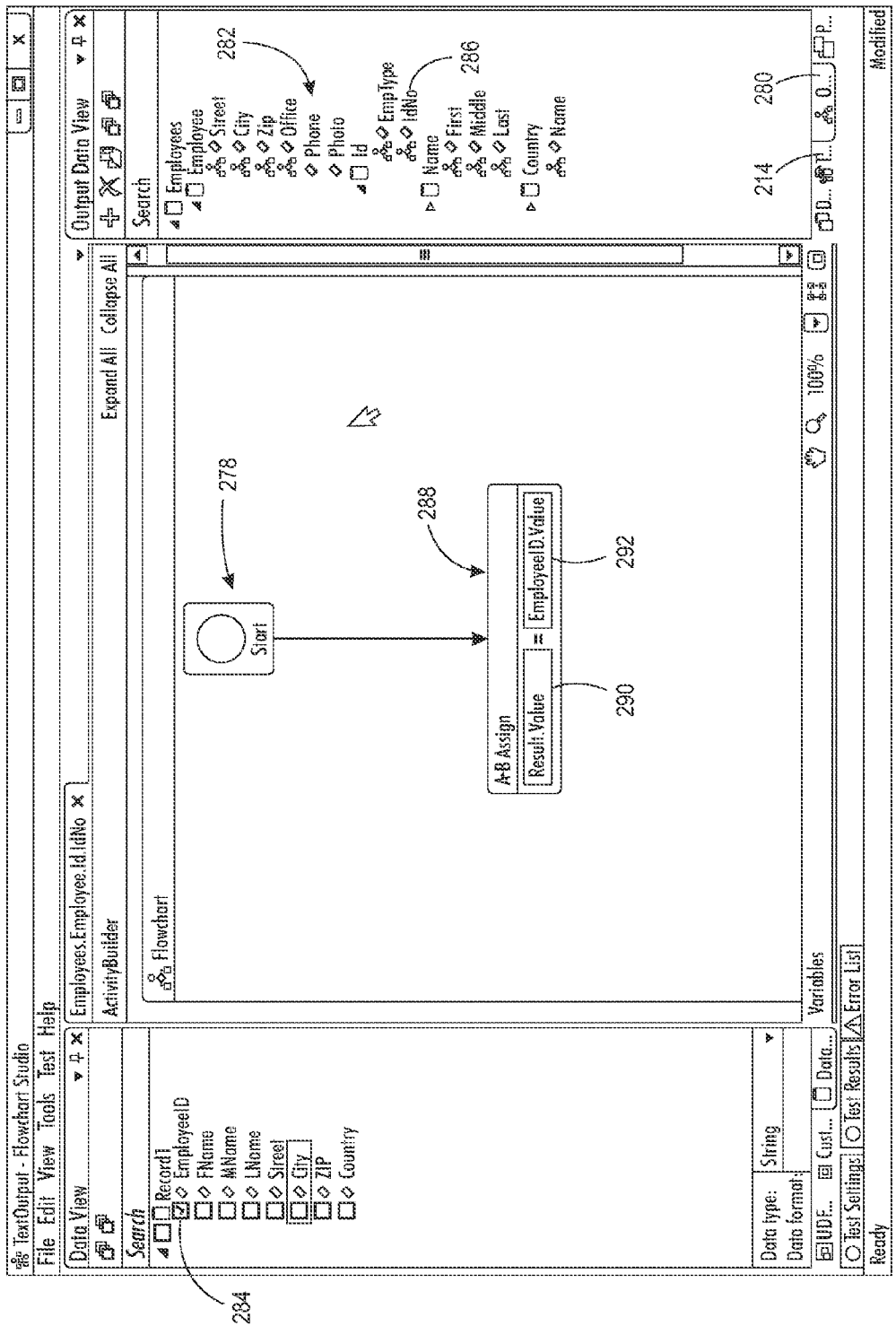
FIG. 11 is a pictorial representation of a computer screen showing a flowchart for the data output mode.

FIG. 11 is a pictorial representation of a computer screen showing a flowchart for the data output mode. Flowchart 278 is constructed in a manner similar to that described for flowcharts 219 and 254, using options displayed by clicking on tab 214. In FIG. 11, tab 280 has been selected, displaying data fields and structure 282 for the destination files. In FIG. 11 the user has clicked on field 284 and dragged the field across the display to drop on field 286. Apparatus 100 automatically generates and displays icon 288 based on this operation. The operation for icon 288 replaces data in field 286 with data from field 284 without modifying the data. Fields 290 and 292 are filled automatically.

Figure 12:
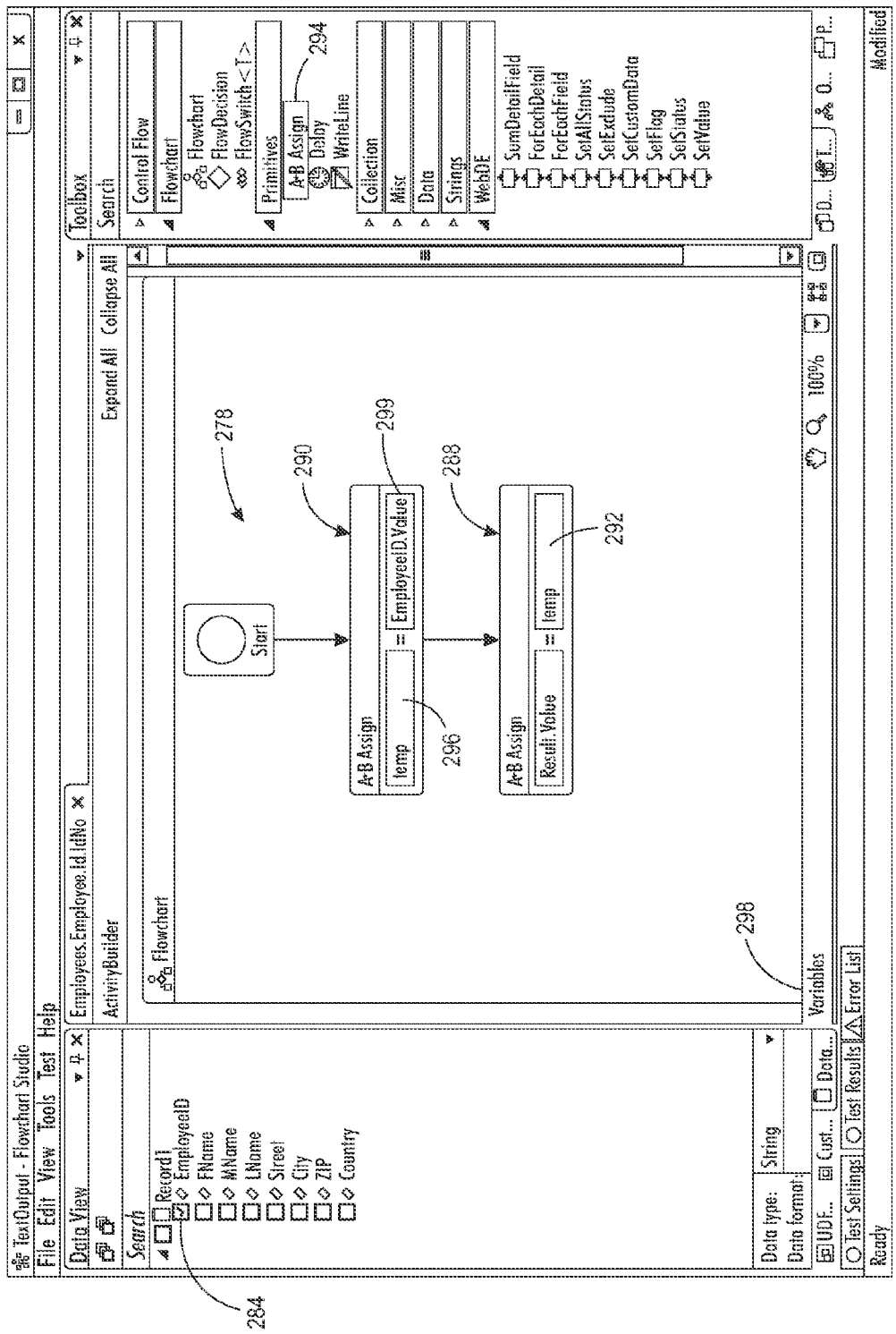
FIG. 12 is a pictorial representation of a computer screen showing a flowchart for the data output mode.

FIG. 12 is a pictorial representation of a computer screen showing a flowchart for the data output mode. In FIG. 12, icon 290 has been added to flowchart 278 by selecting operation 294. When icon 290 is added, field 296 is blank. A list of variables is shown by clicking field 298. For field 296, the variable "temp" was selected. Apparatus 100 automatically fills field 299 with selected data field 284. The user has replaced the entry in field 292 shown in FIG. 11 with "temp". The operations included in flowchart 278 can be implemented to populate field 286. This is analogous to storing data 128 in data file 110B.

Figure 13:
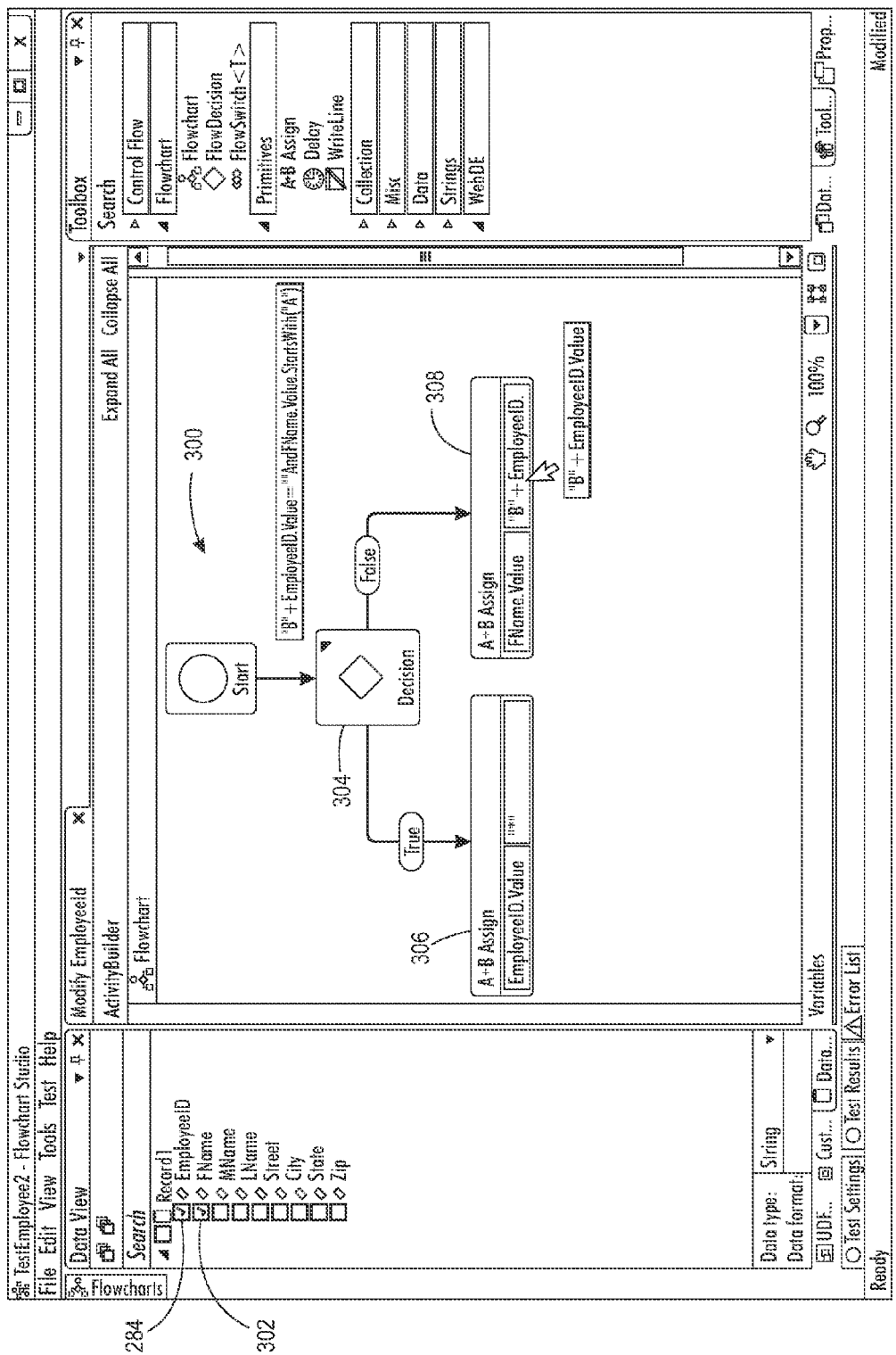
FIG. 13 is a pictorial representation of a computer screen showing a flowchart for the data output mode with interaction of data fields.

FIG. 13 is a pictorial representation of a computer screen showing a flowchart, for the data output mode with interaction of data fields. For flowchart 300, data fields 284 and 302 have been selected. Icons 304, 306 and 308 have been added in a manner similar to that described above. In contrast to flowchart 278, flowchart 300 operates on two data fields of the data source. For example, icon 304 evaluates and selects one of data fields 284 and 302 and based on the evaluation, icons 306 and 308 perform respective operations on the selected data field.

Figure 14:
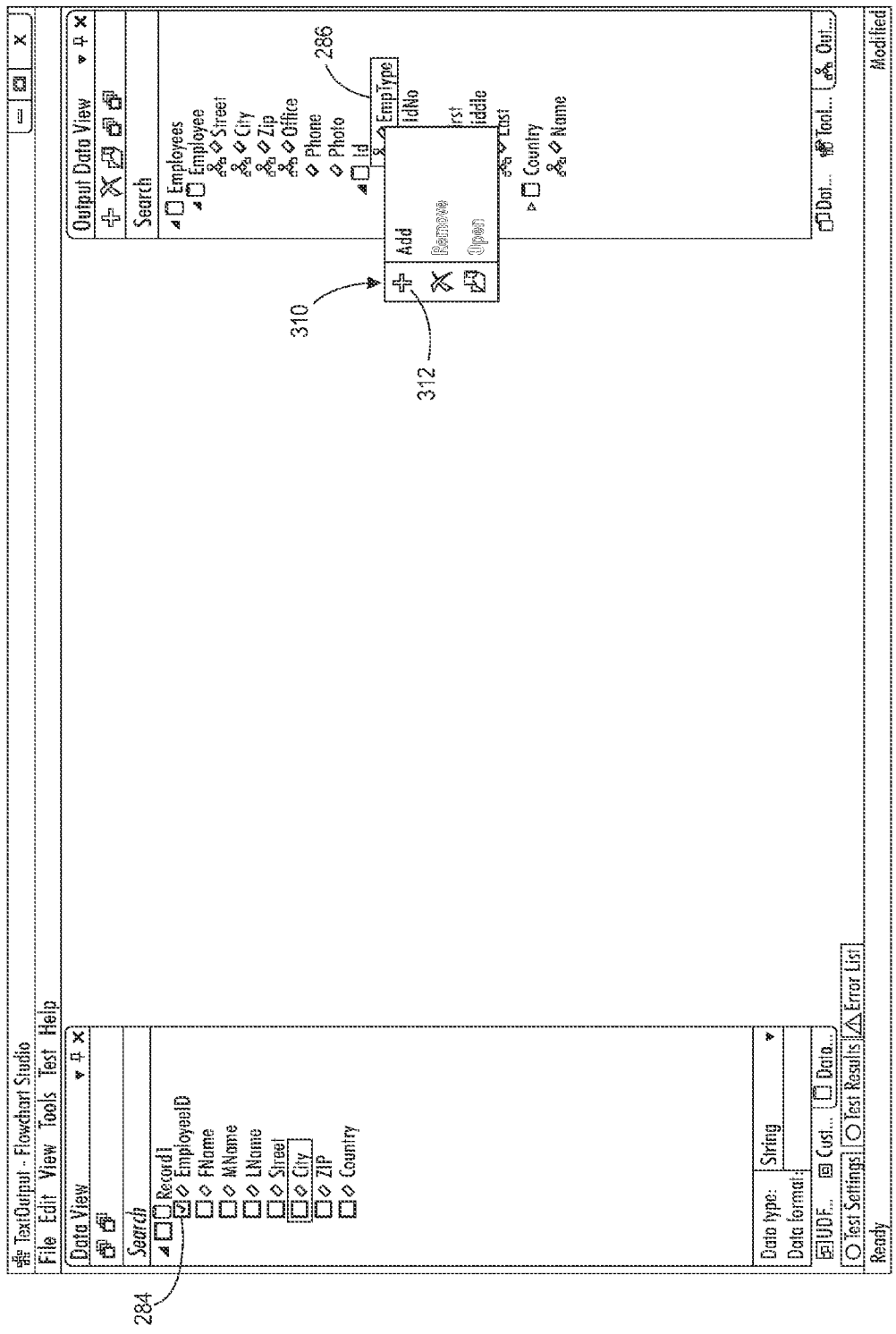
FIG. 14 is a pictorial representation of a computer screen showing an option to add an operation for the data replacement mode.

FIG. 14 is a pictorial representation of a computer screen showing an option to add an operation for the data replacement mode. In FIG. 14, a user has clicked on field 286 to open menu 310. In menu 302, option 312 enables a user to add a flowchart to calculate field values instead of basing a flowchart on data from the input source.

Figure 15:
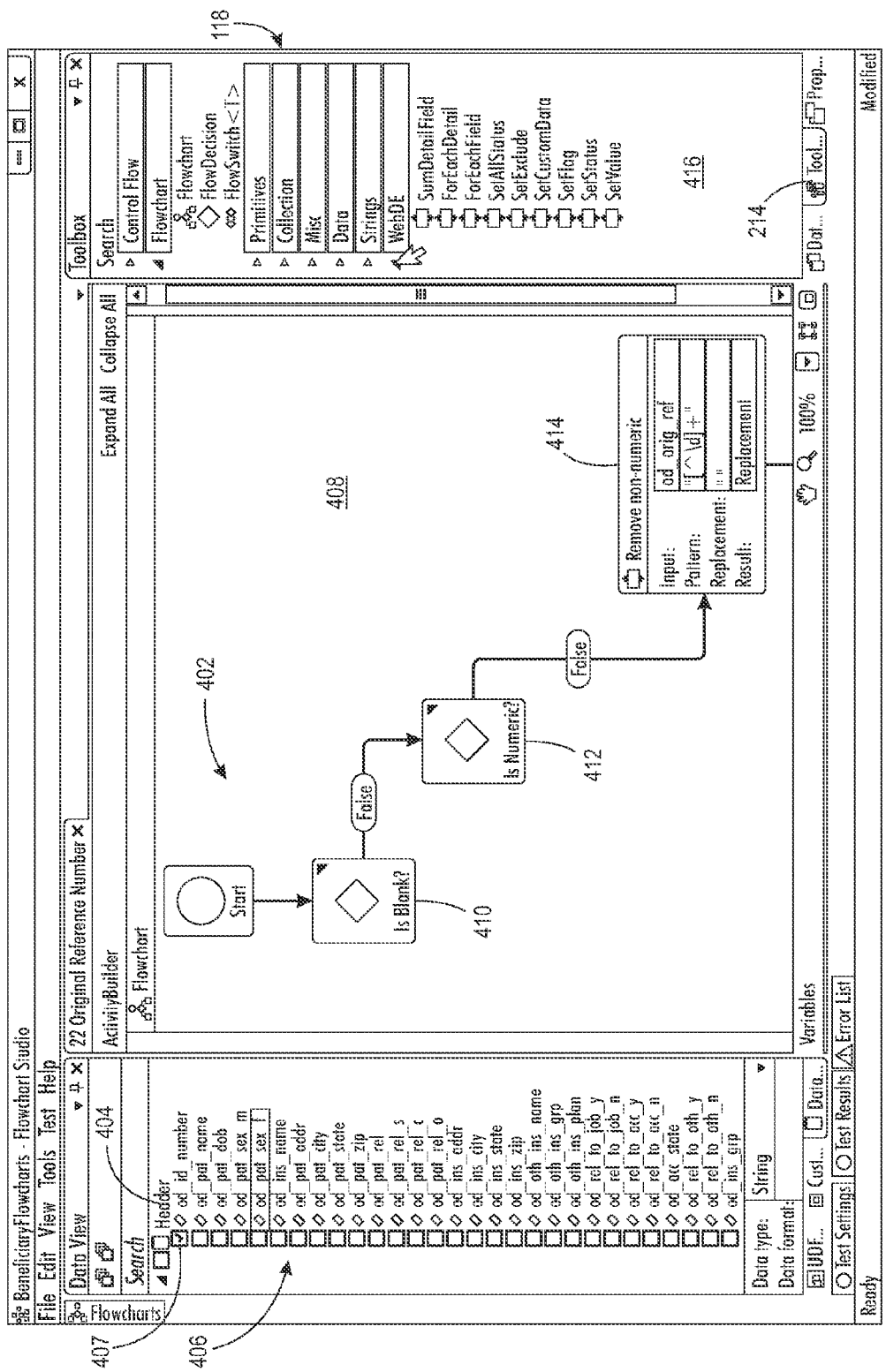
FIG. 15 is a pictorial representation of a computer screen further illustrating operation of the computer-based apparatus of FIG. 1.

FIG. 15 is a pictorial representation of a computer screen further illustrating operation of the computer-based apparatus of FIG. 1. FIG. 15 illustrates an environment for defining rules related to processing data. For flowchart 402 (assembled according to the discussion above, data 120 from data source 404 is edited and saved back to data source 404 (replacement mode). In effect, this updates data 120 in data source 404. Window 406 shows the list of fields (analogous to fields 114) in data source 404 (analogous to file 110A). The user chooses which fields any particular rule will need to process and clicks a check next to the field to include the field. In FIG. 15, the user has selected field 407.

Window 408 shows the rule definition as flowchart 402 with discrete steps (icons) 410, 412 and 414. Window 416 shows toolbox 214 with operations 118 arranged categorically. For example, to add an operation 118 to a flowchart, the user selects and drags the operation to the flowchart view (window 408) and connects the resulting icon, representing the operation, to the flowchart at the appropriate place. The functionality of the operation is added to the flowchart via the icon.

Figure 16:
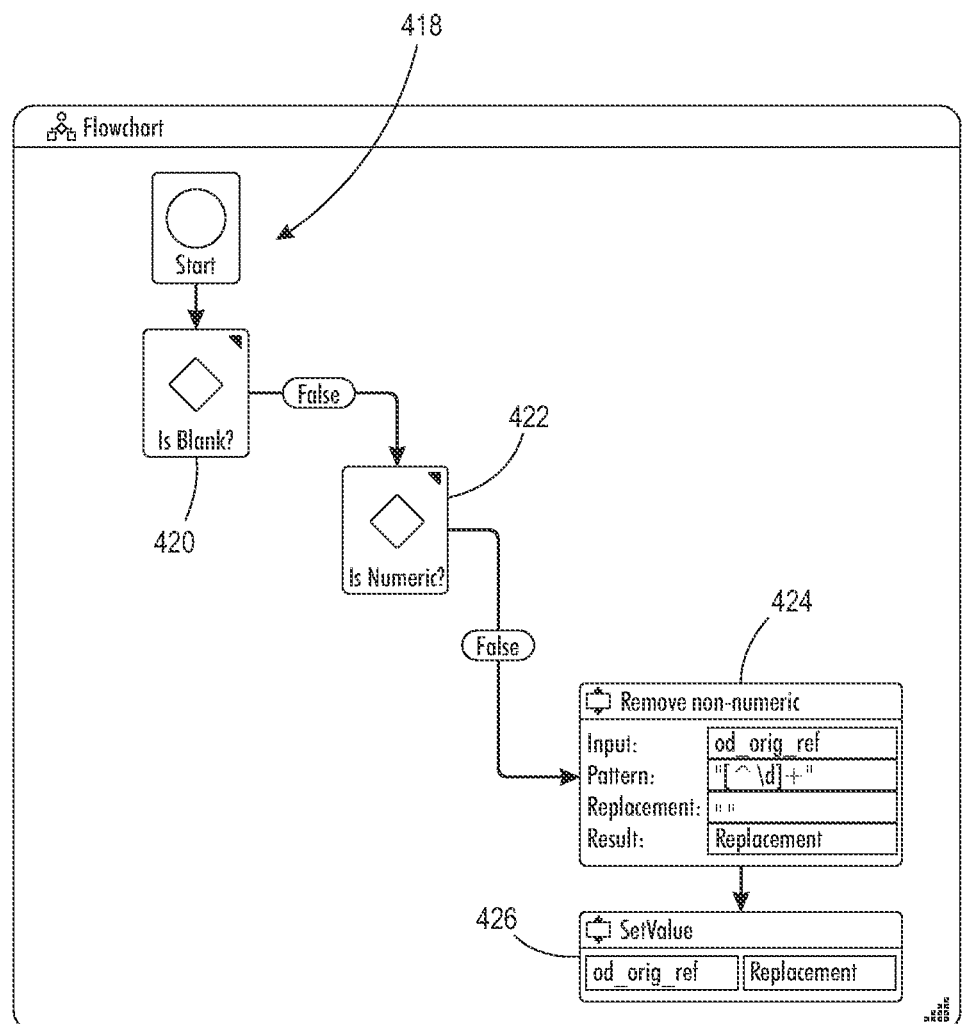
FIG. 16 is a pictorial representation of a computer screen illustrating an example flowchart for the data replacement mode.

FIG. 16 is a pictorial representation of a computer screen illustrating example flowchart 418 for the data replacement mode. Four steps are illustrated in FIG. 16. Icon 420 determines if the field selected for processing is blank. If no, proceed to icon 422; if yes, end processing. Icon 422 determines if the field selected for processing consists of all numeric characters. If no, proceed to icon 424; if yes, end processing. Icon 424 replaces all non-numeric characters in the field selected for processing with a blank, effectively removing all non-numeric characters. Icon 424 stores the resulting modified string (analogous to data 128) in memory and then proceeds to icon 426. Icon 426 copies the string modified by icon 424 into the field selected for processing. This is the last icon in the flowchart, so processing ends.

Figure 17:
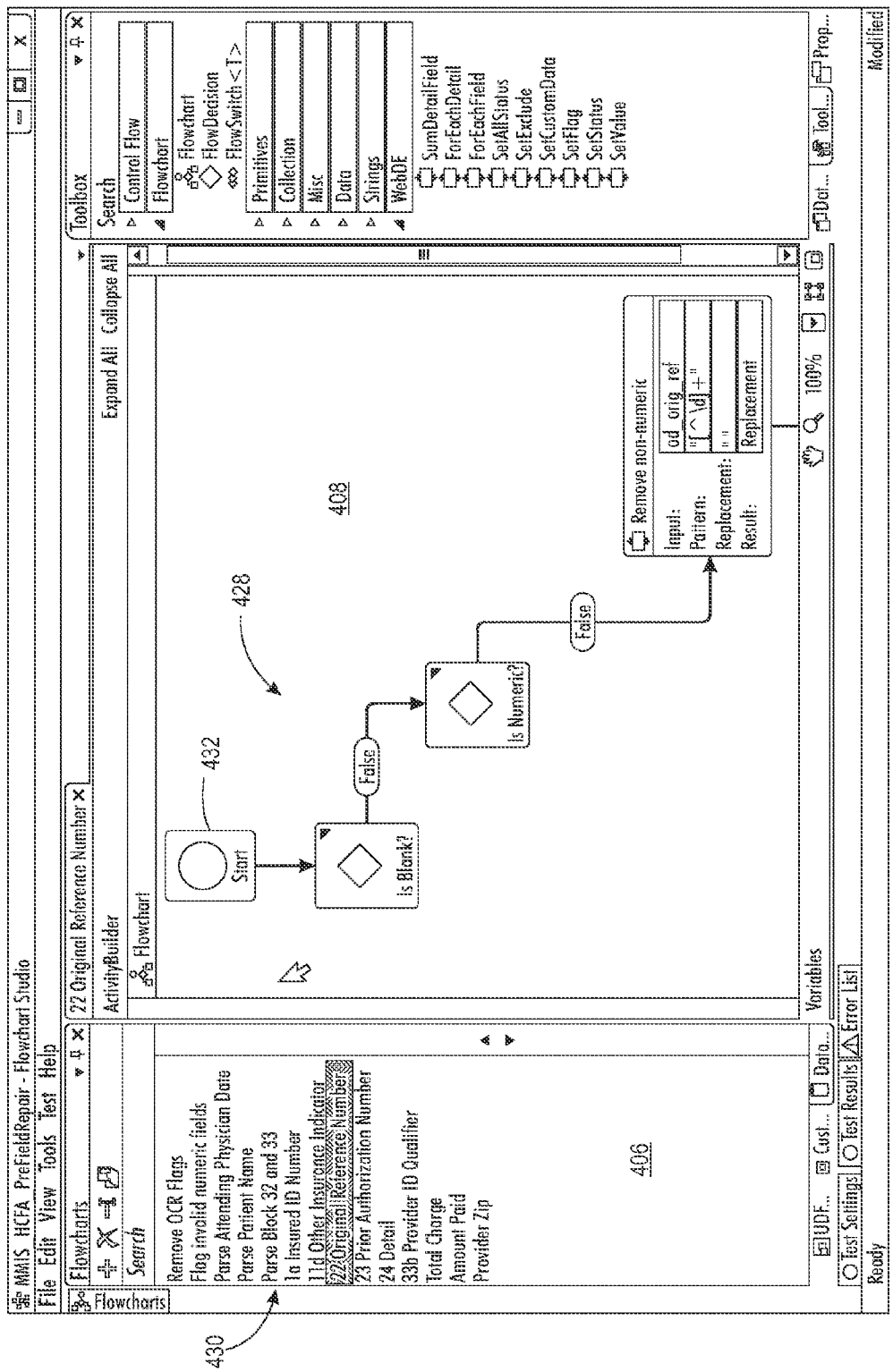
FIG. 17 is a pictorial representation of a computer screen illustrating and example flowchart for the data replacement mode; and, FIG. 18 is a pictorial representation of a computer screen showing and example flowchart for the data output mode.

FIG. 17 is a pictorial representation of a computer screen illustrating example flowchart 428 for the data replacement mode. A list of flowcharts 430 are shown in window 406. The flowcharts are executed in the order in which the flowcharts appear in the list. The user can re-order the list as necessary, remove flowcharts from the list, or add flowcharts to the list as required. Adding a new flowchart to window 406 automatically creates a new, empty flowchart, for example displaying start icon 432, in window 408. Removing a flowchart from the list removes the associated flowchart from a display.

Figure 18:
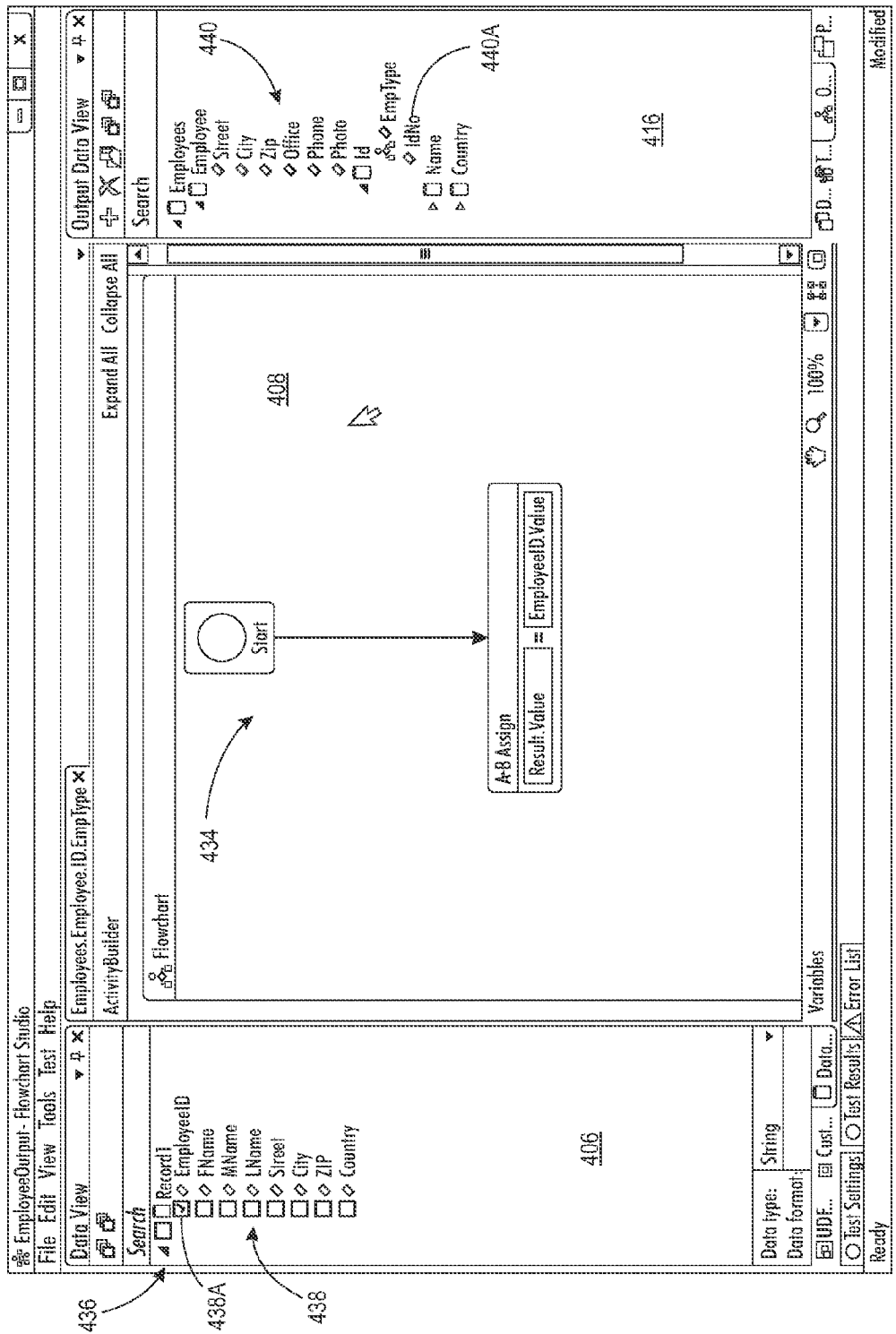

FIG. 18 is a pictorial representation of a computer screen showing example flowchart 434 for the data output mode. Window 406 shows data from originating data source 436, analogous to file 110A. The discussion above related to windows 224 and 406 is applicable to window 406 in FIG. 18 except as follows. Fields 438, analogous to fields 114, can be dragged and dropped on output data window 416 in order to create a mapping from source to destination. Window 408 shows flowchart 434 describing the business logic selected to perform the data mapping, and transformation. In this case, the logic is a simple "Assign Value" operation, but the logic can be as simple or complex as desired. An "Assign Value" operation transfers data from the source file to the destination file without modifying the data. Window 416 shows the data as the data will appear in the destination data source after implementing flowchart 434. Fields 438, for example, field 438A, from the originating data source can be dragged and dropped on fields 440 to create a mapping between data fields in windows 406 and 416. For example, field 438A is dragged and dropped on field 440A. Additionally, flowcharts can be created without a mapping to populate data using custom logic as described in the flowchart.

As described above, apparatus 100 presents data from various sources, for example files 110) to the non-technical user in a common format in the GUI. Data from any data source known in the art, including, but not limited to databases, xml files, text files, proprietary formats, or other sources is presented in a consistent way to the user. The user then defines transformation rules and business rules and logic using a familiar flowchart interface to generate a flowchart, such as flowcharts 219, 254, 278, 300 and 402. The flowcharts are then deployed to runtime engine 139. Engine 139 interprets the logic/operations in the flowcharts and executes the logic/operations as if the logic/operations were computer programs. Data from the data source is then transformed and otherwise edited according to the deployed flowchart logic.

Advantageously, apparatus 100 and methods employing apparatus 100 enable user to transform data and apply rules and logic to data regardless of the format or source of the data and without the need of help from technicians. Apparatus 100 enables users to easily understand rules and logic applied by other users and easily and accurately make modifications as data requirements change. Apparatus 100 reduces the risk of error in defining and modifying data operation rules and logic. Rules and logic implemented using apparatus 100 are clearly communicated between various business stakeholders for validation, confirmation, and acceptance purposes.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based apparatus for operating on data, comprising:
   a memory element for at least one computer configured to store a plurality of computer-readable instructions and at least one first data file; and,
   a processor for the at least one computer configured to execute the plurality of computer-readable instructions to:
   display, on a graphical user interface (GUI), respective representations for:
   at least one second data file included in the at least one first data file;
   a plurality of data fields for the at least one second data file; and,
   a plurality of icons, each icon in the plurality of icons identifying a respective operation applicable to first data stored in the at least one second data file;
   accept at least one first input selecting at least one first data field from the plurality of data fields for the at least one second data file;
   accept at least one second input selecting at least one first icon from the plurality of icons;

associate the at least one first icon with the at least one first data field;
generate a flowchart including the at least one first icon;
display the flowchart on the GUI;
generate second data by performing the respective operations for the at least one first icon on the first data stored in the at least one first data field; and,
replace the first data with the second data; or,
store the second data in at least one third data file included in the at least one first data file,
wherein:
the plurality of computer-readable instructions includes a plurality of data adapters, each data adapter configured to modify a respective type and configuration of data into a single common format; and,
the processor is configured to execute the plurality of computer-readable instructions to, prior to generating the second data, operate on the first data using a respective data adapter configured to modify the first data into the single common format.

2. The computer-based apparatus of claim 1, wherein the plurality of computer-readable instructions includes the respective operations.

3. The computer-based apparatus of claim 1, wherein the processor is configured to execute the plurality of computer-readable instructions to:
for a second icon included in the at least one first icon, display in the first flowchart, a first field for receiving user instructions;
accept a third input including a first user instruction;
display the first user instruction in the first field; and,
perform the respective operation for the second icon according to the first user instruction.

4. The computer-based apparatus of claim 1, wherein the processor is configured to execute the plurality of computer-readable instructions to:
for a second icon included in the at least one first icon:
a first field describing the respective operation for the second icon; and,
a second field for receiving user instructions;
accept a third input including a first user instruction;
display the first user instruction in the second field; and,
perform the respective operation for the second icon according to the respective operation for the second icon and the first user instruction.

5. The computer-based apparatus of claim 1, wherein:
the at least one first data field includes third and fourth data fields;
the at least one first icon includes second and third icons; and,
the processor is configured to execute the plurality of computer-readable instructions to associate the second and third icons with the third and fourth data fields; and,
generating the second data includes performing the respective operations for the second and third icons on third and fourth data stored in the third and fourth data fields, respectively.

6. The computer-based apparatus of claim 5, wherein replacing the second data with the first data includes:
replacing the third data with the first data; or,
replacing the fourth data with the first data; or,
replacing the third and fourth data with at least respective portions of the first data.

7. The computer-based apparatus of claim 5, wherein:
the at least one third data file includes fifth and sixth data fields; and,
storing the first data in at least one third data file included in the at least one first data file includes:
storing the first data in the fifth data field; or,
storing the first data in the sixth data field; or,
storing at least respective portions of the first data in the fifth and sixth data fields.

8. A computer-based apparatus for operating on data, comprising:
a memory element for at least one computer configured to store a plurality of computer-readable instructions and at least one first data file; and,
a processor for the at least one computer configured to execute the plurality of computer-readable instructions to:
display, on a graphical user interface (GUI), respective representations for:
at least one second data file included in the at least one first data file;
a plurality of data fields for the at least one second data file; and,
a plurality of icons, each icon in the plurality of icons identifying a respective operation applicable to first data stored in the at least one second data file;
accept at least one first input selecting at least one first data field from the plurality of data fields for the at least one second data file;
accept at least one second input selecting at least one first icon from the plurality of icons;
associate the at least one first icon with the at least one first data field;
generate a flowchart including the at least one first icon;
display the flowchart on the GUI;
generate second data by performing the respective operations for the at least one first icon on the first data stored in the at least one first data field; and,
replace the first data with the second data,
wherein:
the plurality of computer-readable instructions includes a plurality of data adapters, each data adapter configured to modify a respective type and configuration of data into a single common format; and,
the processor is configured to execute the plurality of computer-readable instructions to, prior to generating the second data, operate on the first data using a respective data adapter configured to modify the first data into the single common format.

9. The computer-based apparatus of claim 8, wherein the processor is configured to execute the plurality of computer-readable instructions to:
for a second icon included in the at least one first icon, display in the first flowchart, a first field for receiving user instructions;
accept a third input including a first user instruction;
display the first user instruction in the first field; and,
perform the respective operation for the second icon according to the first user instruction.

10. The computer-based apparatus of claim 8, wherein the processor is configured to execute the plurality of computer-readable instructions to:
for a second icon included in the at least one first icon:
a first field describing the respective operation for the second icon; and,
a second field for receiving user instructions;

accept a third input including a first user instruction;
display the first user instruction in the second field; and,
perform the respective operation for the second icon according to the respective operation for the second icon and the first user instruction.

11. The computer-based apparatus of claim 8, wherein:
the at least one first data field includes third and fourth data fields;
the at least one first icon includes second and third icons; and,
the processor is configured to execute the plurality of computer-readable instructions to associate the second and third icons with the third and fourth data field; and,
generating the second data includes performing the respective operations for the second and third icons on third and fourth data stored in the third and fourth data fields, respectively.

12. The computer-based apparatus of claim 11, wherein replacing the second data with the first data includes:
replacing the third data with the first data; or,
replacing the fourth data with the first data; or,
replacing the third and fourth data with at least respective portions of the first data.

13. A computer-based apparatus for operating on data, comprising:
a memory element for at least one computer configured to store a plurality of computer-readable instructions and at least one first data file; and,
a processor for the at least one computer configured to execute the plurality of computer-readable instructions to:
display, on a graphical user interface (GUI), respective representations for:
at least one second data file included in the at least one first data file;
a plurality of data fields for the at least one second data file; and,
a plurality of icons, each icon in the plurality of icons identifying a respective operation applicable to first data stored in the at least one second data file;
accept at least one first input selecting at least one first data field from the plurality of data fields for the at least one second data file;
accept at least one second input selecting at least one first icon from the plurality of icons;
associate the at least one first icon with the at least one first data field;
generate a flowchart including the at least one first icon;
display the flowchart on the GUI;
generate second data by performing the respective operations for the at least one first icon on the first data stored in the at least one first data field; and,
store the second data in at least one third data file included in the at least one first data file,
wherein:
the plurality of computer-readable instructions includes a plurality of data adapters, each data adapter configured to modify a respective type and configuration of data into a single common format; and,
the processor is configured to execute the plurality of computer-readable instructions to, prior to generating the second data, operate on the first data using a respective data adapter configured to modify the first data into the single common format.

14. The computer-based apparatus of claim 13, wherein the processor is configured to execute the plurality of computer-readable instructions to:
for a second icon included in the at least one first icon, display in the first flowchart, a first field for receiving user instructions;
accept a third input including a first user instruction;
display the first user instruction in the first field; and,
perform the respective operation for the second icon according to the first user instruction.

15. The computer-based apparatus of claim 13, wherein the processor is configured to execute the plurality of computer-readable instructions to:
for a second icon included in the at least one first icon:
a first field describing the respective operation for the second icon; and,
a second field for receiving user instructions;
accept a third input including a first user instruction;
display the first user instruction in the second field; and,
perform the respective operation for the second icon according to the respective operation for the second icon and the first user instruction.

16. The computer-based apparatus of claim 13, wherein:
the at least one first data field includes third and fourth data fields;
the at least one first icon includes second and third icons; and,
the processor is configured to execute the plurality of computer-readable instructions to associate the second and third icons with the third and fourth data field; and,
generating the second data includes performing the respective operations for the second and third icons on third and fourth data stored in the third and fourth data fields, respectively.

17. The computer-based apparatus of claim 16, wherein:
the at least one third data file includes fifth and sixth data fields; and,
storing the first data in at least one third data file included in the at least one first data file includes:
storing the first data in the fifth data field; or,
storing the first data in the sixth data field; or,
storing at least respective portions of the first data in the fifth and sixth data fields.

18. A computer-based apparatus for operating on data, comprising:
a memory element for at least one computer configured to store a plurality of computer-readable instructions and a plurality of data files; and,
a processor for the at least one computer configured to execute the plurality of computer-readable instructions to:
display, on a graphical user interface (GUI), respective representations for:
first and second data files included in the plurality of data files;
first and second pluralities of data fields for the first and second data files, respectively; and,
a plurality of icons, each icon in the plurality of icons identifying a respective operation applicable to first and second data stored in the first and second data files, respectively;
accept first and second inputs selecting first and second data fields from the first and second pluralities of data fields, respectively;
accept third and fourth inputs selecting first and second icons, respectively, from the plurality of icons;
associate the first and second icons with the first and second data fields, respectively;
generate first and second flowcharts including the first and second icons, respectively;

store the first and second flow charts in the memory element;
display representations for the first and second flowcharts on the GUI in a sequence;
accept a fifth input to implement the first and second flowcharts; and,
implement the first and second flowcharts in the sequence to:
generate third data by performing the respective operation for the first icon on the first data;
replace the first data with the third data; or store the third data in a third data file included in plurality of data files;
generate fourth data by performing the respective operation for the second icon on the second data; and,
replace the second data with the fourth data; or store the fourth data in a fourth data file included in plurality of data files,
wherein:
the plurality of computer-readable instructions includes a plurality of data adapters, each data adapter configured to modify a respective type and configuration of data into a single common format; and,
the processor is configured to execute the plurality of computer-readable instructions to, prior to generating the third and fourth data, operate on the first and second data using a respective data adapter configured to modify the first and second data into the single common format.

* * * * *